United States Patent
Conner et al.

(10) Patent No.: US 7,350,717 B2
(45) Date of Patent: Apr. 1, 2008

(54) HIGH SPEED SMART CARD WITH FLASH MEMORY

(75) Inventors: Finis Conner, Carmel, CA (US); Robert Couse, Los Gatos, CA (US); An Van Le, San Jose, CA (US); Anil Nigam, Saratoga, CA (US)

(73) Assignee: Conner Investments, LLC, Carmel, CA (US)

( * ) Notice: Subject to any disclaimer, the term of this patent is extended or adjusted under 35 U.S.C. 154(b) by 0 days.

(21) Appl. No.: 11/400,578

(22) Filed: Apr. 7, 2006

(65) Prior Publication Data

US 2007/0158439 A1 Jul. 12, 2007

Related U.S. Application Data

(60) Provisional application No. 60/741,614, filed on Dec. 1, 2005.

(51) Int. Cl.
*G06K 19/06* (2006.01)
(52) U.S. Cl. ................. 235/492; 235/375; 235/451
(58) Field of Classification Search ............. 235/375, 235/492, 451; 761/1
See application file for complete search history.

(56) References Cited

U.S. PATENT DOCUMENTS

| | | | |
|---|---|---|---|
| 6,168,077 B1 * | 1/2001 | Gray et al. | 235/375 |
| 6,439,464 B1 * | 8/2002 | Fruhauf et al. | 235/492 |
| 6,883,715 B1 * | 4/2005 | Fruhauf et al. | 235/492 |
| 6,913,196 B2 * | 7/2005 | Morrow et al. | 235/451 |
| 6,988,250 B1 * | 1/2006 | Proudler et al. | 716/1 |
| 2006/0025020 A1 * | 2/2006 | Yu et al. | 439/630 |
| 2006/0057974 A1 * | 3/2006 | Ziarno et al. | 455/98 |

* cited by examiner

*Primary Examiner*—Michael G. Lee
*Assistant Examiner*—Allyson N Trail
(74) *Attorney, Agent, or Firm*—Townsend and Townsend and Crew LLP

(57) ABSTRACT

A card and reader system is provided enabling larger storage capacity and faster data transmission. The card is configured in a Smart Card or SIM card format and communicates with either standard Smart Card readers or specially configured readers capable of higher data transmission speeds. Eliminating the processor from the card and including it in the reader allows the cost of the card to be reduced. A software driver installed in existing Smart Card readers enables the additional storage capability of the card to be concealed from the reader, thereby eliminating a need to replace readers already deployed.

16 Claims, 6 Drawing Sheets

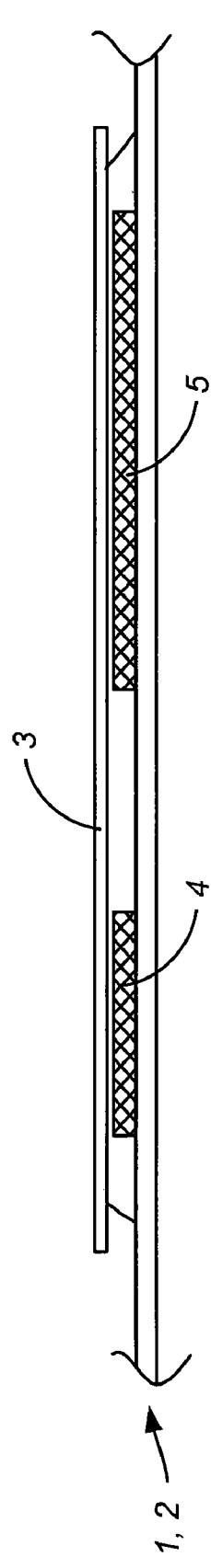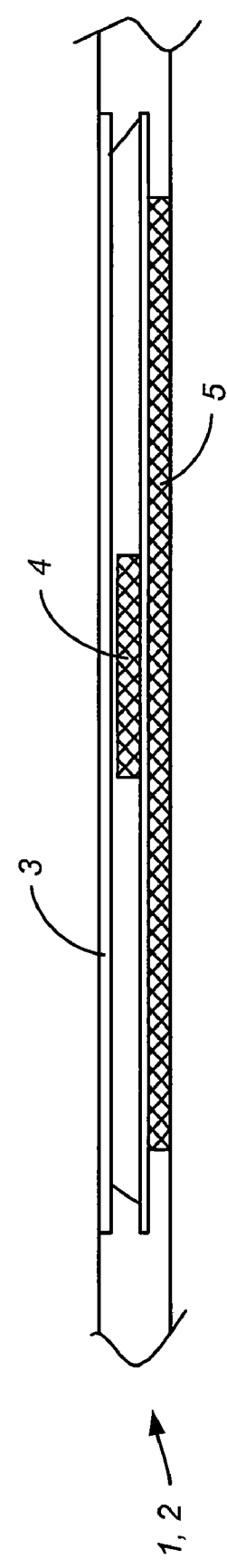
FIG. 3
FIG. 4

HIGH SPEED SMART CARD WITH FLASH MEMORY

CROSS REFERENCE TO RELATED APPLICATION(S)

This application claims priority from U.S. Provisional Application No. 60/741,614, filed Dec. 1, 2005, and entitled "High Speed Smart Card with Flash Memory."

BACKGROUND OF THE INVENTION

This invention relates to credit card size devices which include microprocessors and memory, often referred to as Smart Cards. In particular this invention relates to those cards required for secure transactions, and which require a large local data storage capability. Smart Cards are widely used in Europe as bank cards, health insurance cards, debit cards, and phone cards. They are also used to provide access to corporate networks and for other similar applications. The Smart Card architecture is conventionally based upon the ISO 7816 standard and requires a reader mechanism, in which the Card must be placed, for operation. This reader mechanism has minimal functionality, with all of the data processing and storage being performed by the microprocessor and memory in the Smart Card. The ISO 7816 interface utilizes six (6) contacts which are arranged on the surface of a the plastic card and allow data to be exchanged, usually at a maximum speed of about 116 kilobits per second.

Smart Cards are commercially available as memory only cards with 1 kilobyte (KB) to 256 KB of read/write storage; or with a microcontroller usually based on the 8051 or ARM architecture. The microcontroller based Smart Cards cost more and provide on-card data processing to achieve high security. The computing power, storage capacity and the speed at which data can be exchanged is limited by the electronic in the card, all of which must be contained within a thin plastic structure. The relatively high cost of these cards has limited their popularity in the United States, with the result that cheap magnetic stripe credits cards with 140 bytes of read only storage remain the dominant instrument for consumer credit/debit transactions, driver licenses, and access controls to facilities and networks.

A Smart Card with both a USB and ISO 7816 interface has been developed. For example, see the e-gate Smart Cards sold by Axalto. Another Smart Card sold by Sharp Inc has a microcontroller additional digital logic to support a USB interface and 1 MB of Flash memory storage. USB data transfer is implemented utilizing the remaining two contacts in the eight pad Smart Card connector with a maximum data transfer speeds of about 1.5 Mbits/second because of power and heat limitations. Such performance is considered slow for a content download device in which entertainment or other information is stored on the device for presentation to a user. Although the microcontroller for these newer cards is more powerful than in prior generations, the throughput is poor for emerging applications such as digital right management.

The growth of the Internet as a delivery medium has created a need for a local data storing card with large capacity, and which is secure, rugged and as convenient as a Smart Card, but has fast data transfer speed for quick transaction times and "off-line" debit/credit transaction capability.

BRIEF SUMMARY OF THE INVENTION

We have developed a small portable card that is as secure, rugged and convenient as a Smart Card, but which has large storage capacity for storage of substantial quantities of information, fast data transfer speed for quick transaction times, and "off-line" debit/credit transaction capability. The card enables the use of available Internet based services such as "pay-per-view" programs for downloaded content, books, games, songs and movies. Additionally, government services can be enhanced utilizing the card as a driver license or social security card, potentially with biometric information securely stored thereon to authenticate a user of the card. Other uses for such a card include storage of medical records that remain in the possession of the patient, and more stringent access controls based upon multiple biometric verifications.

This invention provides an architecture for a fully ISO 7816 compliant card with an order of magnitude higher data transfer speed, computing power and data storage capacity. The cost of the card is small with minimal electronics installed, with the bulk of the electronics implemented in the reader mechanism, where a faster microprocessor with a sophisticated operating system can be utilized, and replaced as subsequent generations of microprocessors provide higher speed and additional features. The architecture of the card enables low cost of manufacture.

Typical Smart Card applications include multiple cards, each of which operates in a specific reader mechanism, making it important to the customer to have a low cost card. An additional feature of the card described herein is that it is fully compatible with existing Smart Card readers. Hardware authentication is implemented in the card with unique keys installed in the card and the reader during the personalization process. The combined system of card and reader is organized to achieve security at least equivalent to the Smart Card.

In summary, this invention provides a card in the same form factor as a Smart Card or a SIM Card, with a unique reader with the features enabling high data transfer speeds (e.g. 2500 megabits per second); on card secure read and write storage of large amounts of data (e.g. 8 megabytes), and 256 bit AES encryption and decryption at these transfer speeds. In some implementations, the reader also includes a high performance microprocessor such as an ARM 11 or XScale. Data zones in the card memory may be configured as unprotected, authenticated-access only, and/or authenticated access with encryption. The card is functional in standard Smart Card readers, although at the reduced data speeds of such readers. The card includes security and authenticated access suitable for "off-line" credit/debit functionality, digital rights management, and other applications such as for passports and storage of medical information. The card operates in environments including PCI, USB, Ethernet, Wi-Fi, and broadband.

BRIEF DESCRIPTION OF THE DRAWINGS

FIG. 3 is a cross section of the electronic modules on the card when arranged side-by-side;

FIG. 4 is a cross section of the electronic modules on the card when arranged one-atop-the-other;

DETAILED DESCRIPTION OF THE INVENTION

This invention provides a secure storage system configured as a Smart Card or as a SIM Card. It provides a high-capacity storage capability on the card with interfaces for communicating with an external reader. These interfaces can include a conventional Smart Card interface according to the ISO 7816-3 standard, a high speed interface that allows an external reader to access the memory on the card, and an interface switch unit which multiplexes the ISO 7816-3 contacts to enable both a high speed interface with dual differential signals and the standard ISO 7816-3 interface.

The invention also provides a reader mechanism that interfaces with the high capacity storage device via the interfaces described above, and a software module running on a host PC. The software provides customizable security-oriented applications that utilize the storage device and the reader.

Figure 1:
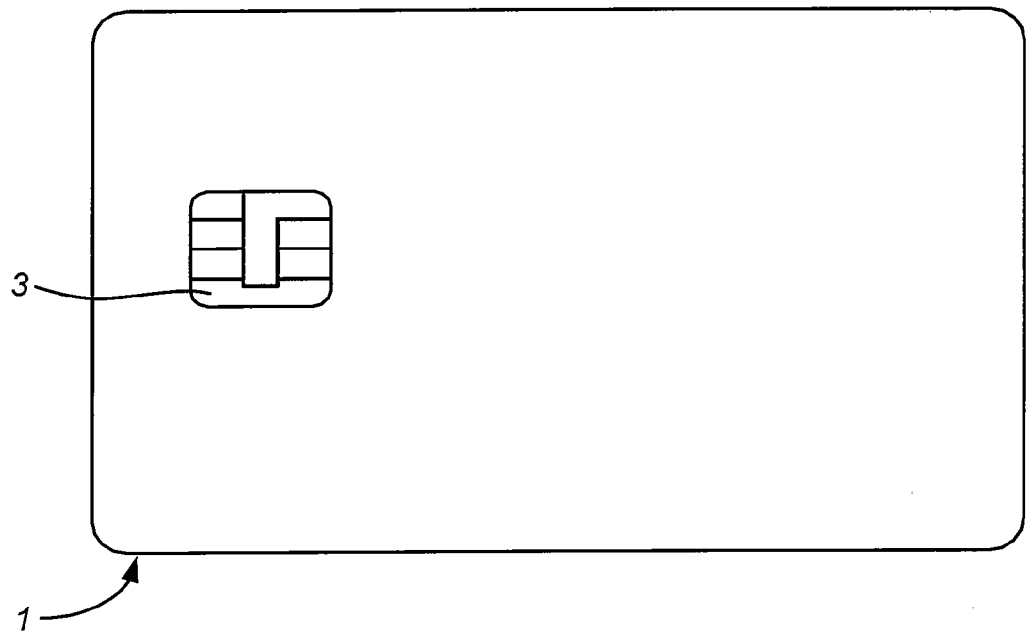
FIG. 1 is a plan view of a card of an embodiment of this invention conforming to ISO 7816 size and format.
Figure 2:
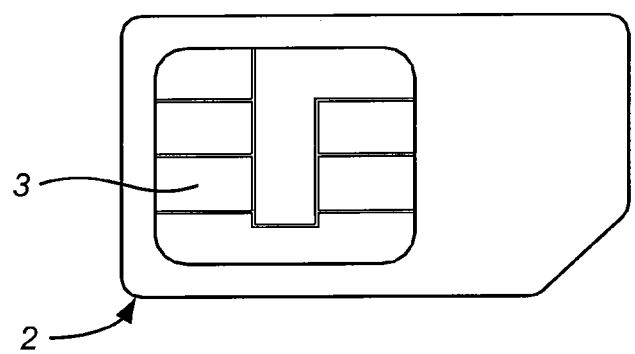
FIG. 2 is a plan view of a card of an embodiment of this invention conforming to SIM card size and format.

FIG. 1 is a diagram illustrating a preferred embodiment of card 1 in a Smart Card format. FIG. 2 illustrates an implementation of the card 2 in a SIM card format. In each case the electrical contacts 3 to the card are arranged according to the appropriate standard. The physical dimensions of card 1 shown in FIG. 1 are 85.6 mm×53.98 mm×0.8 mm. The dimensions for SIM card 2, shown in FIG. 2, are 25 mm×15 mm×0.8 mm.

As shown in FIGS. 3 and 4 two integrated circuit (IC) die 4 and 5 are arranged on card 1 below the contact pad structure 3, one providing CMOS logic 4 and the other providing flash memory 5. In one embodiment NOR flash is used as the storage, although other embodiments will employ NAND flash. It is also possible for flash memory 5 to be integrated into the logic block 4, however, presently most flash memory is manufactured with a different manufacturing process than logic 4, making the cost of such a device higher than the two die arrangement shown in FIGS. 3 and 4.

Typically, NAND flash memory die are larger than NOR flash die. Thus a configuration as shown in FIG. 4 with the die 4 and 5 in a stacked arrangement under the metal contacts 3 can help prevent handling damage. If desired, the IC die can be potted using security glue to attempt to preclude probing of individual contact pads on the die to reveal the stored information. The IC dies can be arranged in a side-by-side mounting as shown in FIG. 3 or atop each other as shown in FIG. 4.

Figure 5:
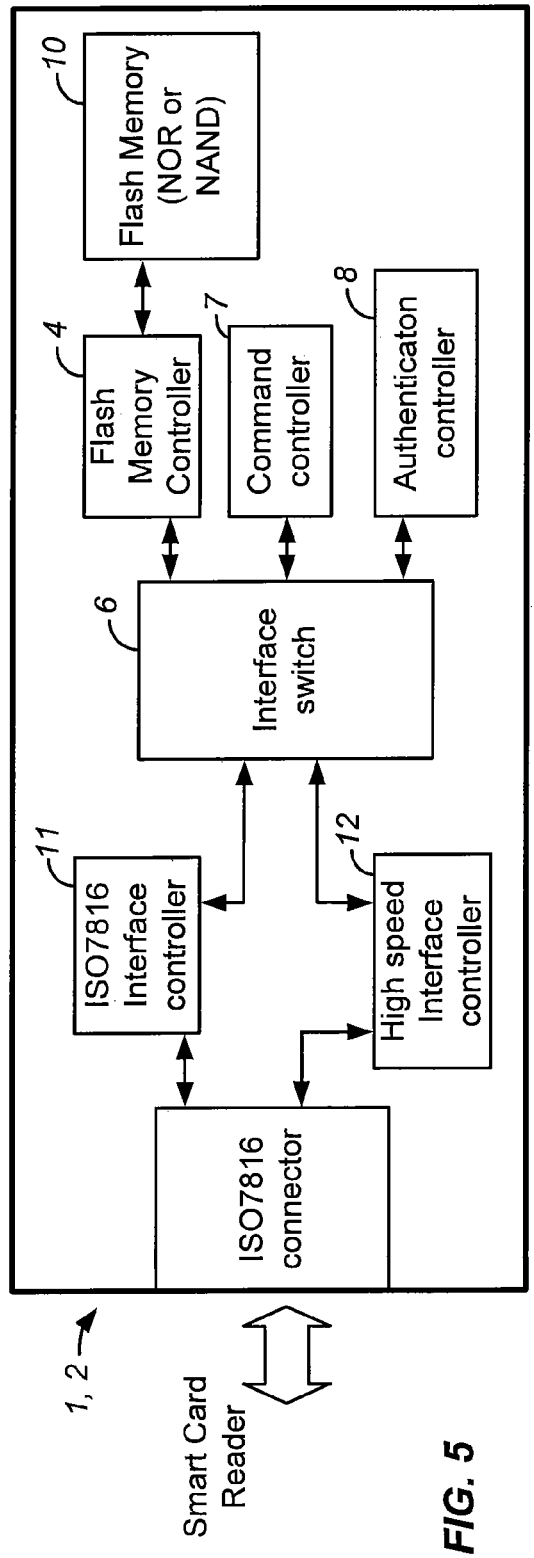
FIG. 5 is a block diagram illustrating the internal architecture of the card.

The hardware architecture of card 1 is shown in FIG. 5. As shown, a standard ISO 7816 connector couples the reader (not shown) to an interface controller 11 or 12. In the depicted embodiment card 1 has two interfaces—an ISO 7816 and a high speed interface. The choice is selectable during execution of an authentication protocol stored in the command controller 8 and/or the authentication controller 7. This allows card 1 to be installed in an industry standard Smart Card reader, or in a special high speed reader, as described below. The two interfaces are managed by interface switch 6 which directs the reader commands and data as appropriate to the command controller 7, the authentication controller 8, and the flash memory controller 9. According to the commands the controller 9 stores or retrieves the data from flash memory 10. Flash memory 10 can be arbitrarily large, for example, providing from multiple megabytes to multiple gigabytes of storage. This architecture gives the card system minimal complexity, and it can be implemented at low cost with maximum compatibility, flexibility, large storage, and high performance.

As mentioned, the card interface switch 6 automatically detects which type of reader (standard or high speed) is connected to card 1. This is accomplished by having the interface switch 6 check the presence of the ISO 7816 clock or the high speed interface data to determine which interface to use during a communication sequence. Initially high speed interface controller 12 uses the two contacts C4, 13, and C 8, 14 (shown in FIG. 6) on the standard ISO 7816 interface connector 3 in a single-ended configuration at a reduced data rate to transfer initialization information. If the high speed mode is selected, then the clock contact C3, 15, and I/O contact C7, 16, are also used with the previously used contacts C4, 13, and C8, 14, to enable a high speed differential signal interface. The differential signal arrangement is one in which the signals are transmitted by two lines, instead of a single ended arrangement where the single is usually referenced to ground potential. The differential configuration provides better noise immunity and allows higher communication speeds.

For low-cost implementations, interface switch 6, flash memory controller 9, command controller 7, and authentication controller 8 can be implemented in an ASIC or a custom IC. In applications where it is desirable to use an existing Smart Card IC such as a Cryptomemory IC (manufactured by Atmel), however, the functions of command controller 7 and authentication controller 8 are replaced by the logic of the IC. In other embodiments the function of command controller 8 and the authentication controller 7 can be implemented utilizing commercially available 8 bit Smart Card ICs such as the SmartMX family of ICs sold by Philips Semicondutor. Employing an available Smart Card IC can provide an advantage, particularly if desirable security protection features are already implemented within such an IC. This eliminates the need for these functions in the digital logic of interface switch 6, thereby simplifying its design.

Figure 7:
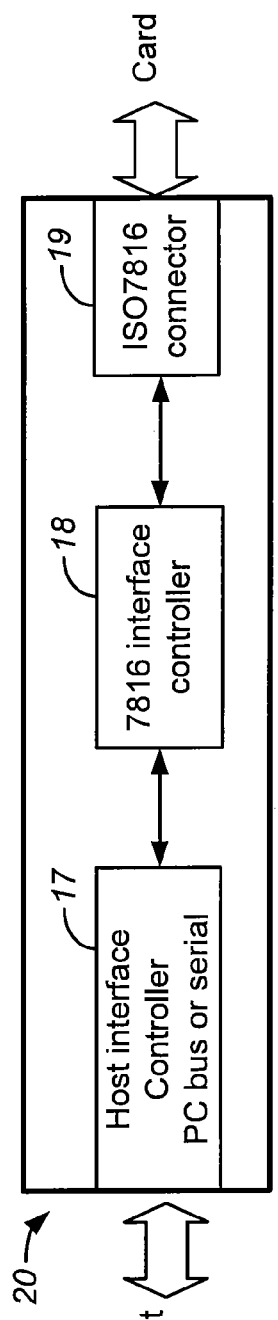
FIG. 7 is a block diagram of an embodiment of the architecture of a prior art reader for the card.
Figure 8:
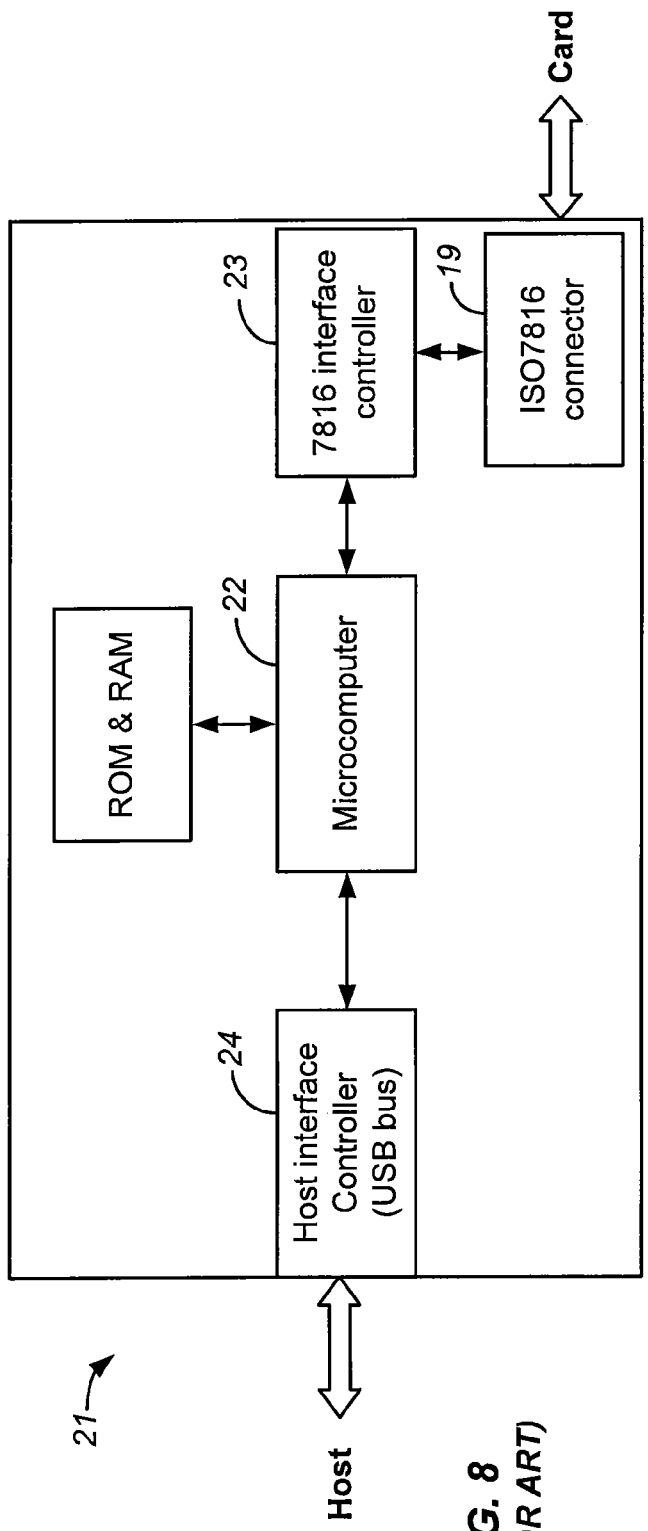
FIG. 8 is a block diagram of a prior art reader for the card with a USB interface to the host.

As previously described, card 1 can be used in both industry standard and high speed readers, such as a reader described below. An industry standard Smart Card reader 20, shown in FIG. 7, interfaces to a host using any desired PC bus interface (PCI, ISA, serial port) via an interface controller 17. It also includes an ISO 7816 interface controller 18 which is used to send and receive the protocol packets to and from a typical Smart Card via connector 19. Connector 19 interfaces with contact pads 3 located on the card when the card is inserted in the reader mechanism. The host manages the two controllers and the ISO 7816 protocol using a device driver, and the data and user information passes directly between these two interfaces. An industry standard USB interface Smart Card reader 21 is shown in FIG. 8. It consists of a microcomputer 22 that manages the ISO 7816 and USB protocols, the 7816 interface controller 23, and USB interface controller 24. The legacy architectures for the Smart Card and the USB readers are designed to minimize the cost of the reader, and operate at low data transfer rates.

Figure 9:
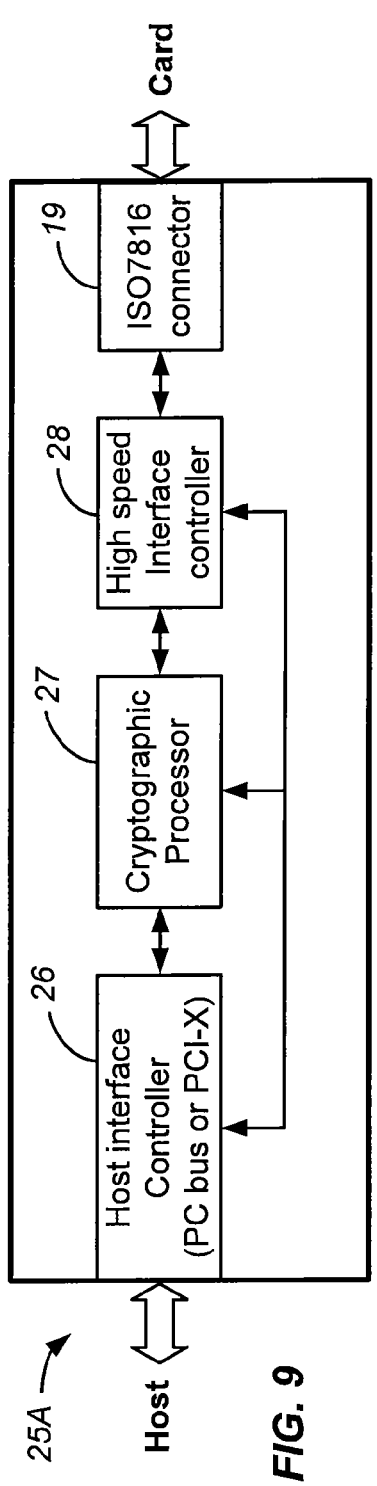
FIG. 9 is a block diagram of a first embodiment of an architecture for a high speed reader.
Figure 10:
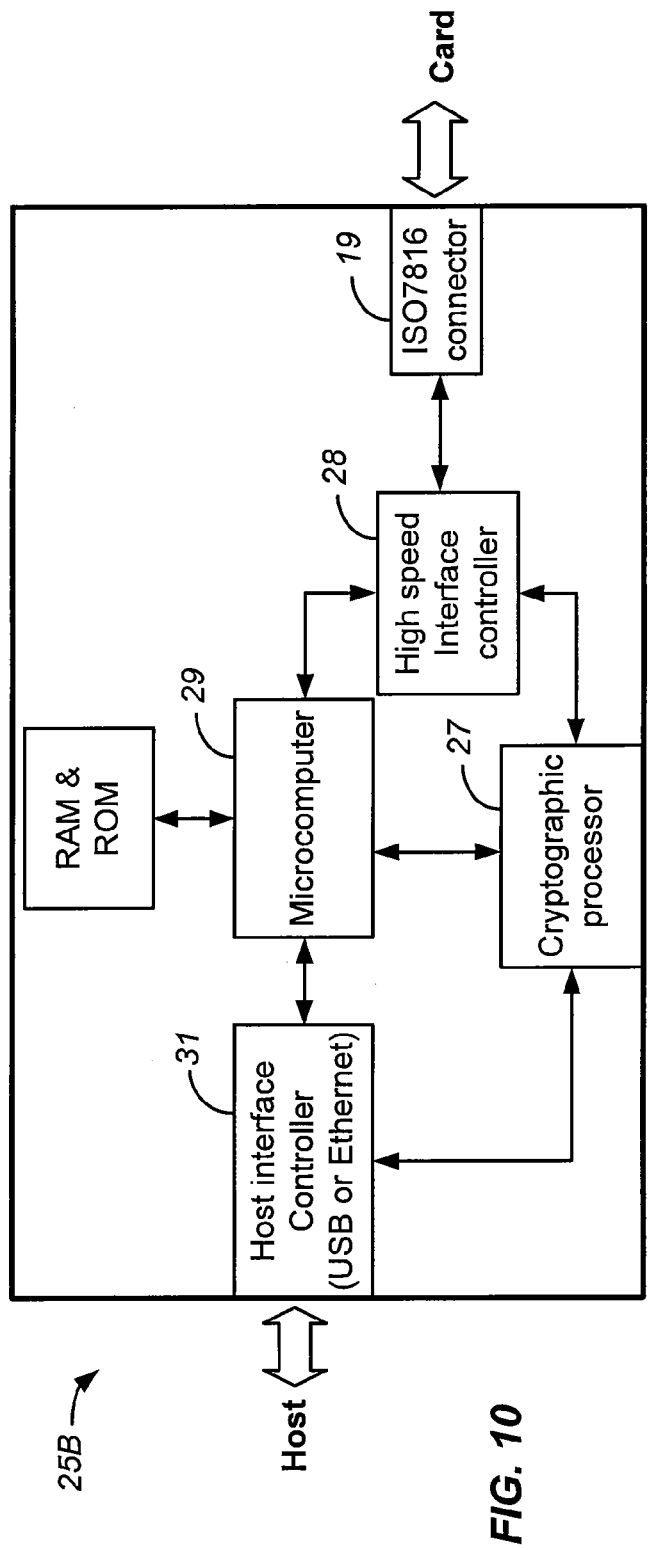
FIG. 10 is a block diagram of a second embodiment of an architecture for a high speed reader.

Two preferred embodiments for high speed reader architectures are shown in FIGS. 9 and 10. A first high speed reader 25A (referred to herein as a type 1 reader) shown in FIG. 9 is connected directly to the host through either a PC bus or PCI-X bus interface 26. The host manages the host interface 26, the cryptographic processor 27, the ISO 7816 controller 28, and the ISO 7816 communication protocol of the card, e.g. card 1, utilizing an appropriate device driver installed in the host. ISO 7816 protocol packets and data are sent to and from card 1 through high speed interface 28, cryptographic processor 27, and host interface 26. The data path allows for high speed transfers controlled by the PCI or PCI-X interface. Data encryption and decryption is implemented in hardware module 27, for example using an AES engine.

Another high speed reader architecture (referred to as a type 2 reader) 25B is shown in FIG. 10. Instead of relying on the processing power of the host, it uses microcomputer 29 to handle the ISO 7816 protocol, and to control the operations of cryptographic processor 27 and high speed controller 28. In this implementation microcomputer 29 provides the setup for the logic modules 27, 28 and 31. Once the setup is complete microcomputer 29 is not in the data path, allowing this to be controlled by the host interface controller 31 to achieve very high data transfer speeds. One advantage of this architecture is that no device driver is required on the host system.

In either of the implementations discussed above, the capability of cryptographic processor 27 can vary, depending on the nature of the security application. For example, if an application partitions the data zones in the flash memory into just two zones—(1) an unprotected zone and (2) an authenticated access only zone, then cryptographic processor 27 may only need to implement the authentication mechanisms. In this case, no encryption engine is required. This may be desirable if the cost of the type 1 reader 25A is to be low. On the other hand, if the authenticated access zone is to have encrypted data for higher security (referred to as the "encrypted zone"), cryptographic processor 27 will implement the encryption and decryption engine (e.g., AES engine) along with the authentication mechanism. Furthermore, if the authentication mechanism is based on public key cryptography (also known as asymmetric cryptography), the cryptographic processor 27 may implement a public key accelerator to reduce time-intensive asymmetric cryptographic operations. Those skilled in the art will recognize that for the type 2 high speed reader 25B, there are various ways to divide the security features between the microcomputer 29 and the cryptographic processor 27.

For large storage capacity cards, high speed data transfer is more important. The standard Smart Card reader 20, using the ISO 7816 interface 18, can access small amounts of data within a convenient time period, however, to load large data files a high speed interface is necessary to achieve convenient transaction times, for example, as shown in Table 1.

TABLE 1

Data Transfer Performance

| Card interface | Data Transfer Rate (Mbit/sec) | Transfer Time 8 Mbytes | 256 Mbytes | 1 Gbyte |
| --- | --- | --- | --- | --- |
| ISO 7816 | .150 | 557 sec (9.3 m) | 17809 sec (297 m) | 69565 sec (1159 m) |
| rapid I/O | 1250 & 2500 | .05 & .03 sec | 1.6 & .82 sec | 6.4 & 3.2 sec |
| SDI | 52 | 1.23 sec | 39 sec | 154 sec |
| SPI | 50 | 1.28 sec | 41 sec | 169 sec |

Figure 6:
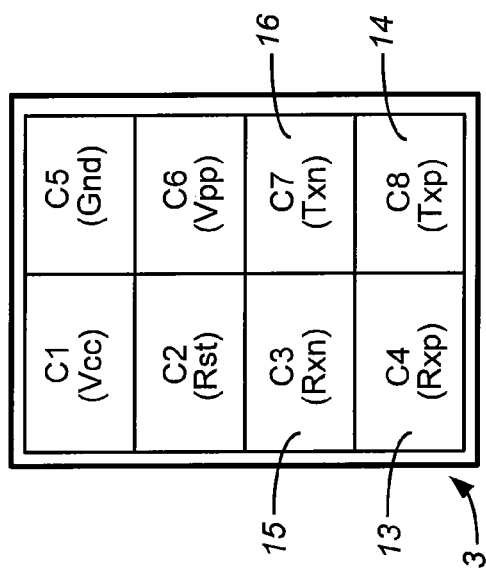
FIG. 6 is a diagram illustrating the ISO 7816 connector contact pad arrangement and in parentheses the pad assignments of an embodiment of this invention.

In one embodiment card 1 uses the ISO 7816 interface connector 3 as shown in FIG. 6 to implement a rapid I/O interface between the card and either of the high speed readers 25A or 25B. The rapid I/O interface is capable of at least a 2500 Mbit/sec data rate when implemented using CMOS 90 micron or smaller gate geometry digital logic in high speed controller 28 and the interface switch 6.

Currently available NAND flash memory supports a maximum data transfer speed of about 800 megabits per second. which the rapid I/O can easily support. Slower data rate implementations for lower capacity embodiments of card 1 can use the industry standard serial flash memory interface SPI or the SDI interface, resulting in data transfer speeds of 50 megabits per second.

Reader 25B has a high speed data path. The host interface controller 31 can use a USB 2.0, Ethernet, PCI, or PCI-X interface. USB 2.0 is a popular personal computer interface and can be used for data speeds up to about 480 Mbits/sec. Ethernet and 802.11g can be used in large area networks with the reader located at a distance from the host computer, while PCI and PCI-X can be used for internally mounted readers.

TABLE 2

Interface Performance

| Host interface | Max. Transfer Rate (megabits per second) | Transfer Time 8 Mbytes | 256 Mbytes | 1 Gbyte |
| --- | --- | --- | --- | --- |
| USB 2.0 | 480 | 0.13 sec | 4 sec | 16 sec |
| USB 1.1 | 12 & 1.5 | 5.3 sec (09 m) & 43 sec (0.71 m) | 171 sec (2.8 m) 1365 sec (23 m) | 667 sec (11 m), 5333 sec (89 m) |

TABLE 2-continued

Interface Performance

| Host interface | Max. Transfer Rate (megabits per second) | Transfer Time 8 Mbytes | 256 Mbytes | 1 Gbyte |
|---|---|---|---|---|
| Ethernet | 100, 1000, 10000 | 0.64, 0.06, 0.01 sec | 20, 2, 0.2 sec | 80, 8, 0.8 sec |
| PCI-X | 2500 | .03 sec | .82 sec | 3.2 sec |
| PCI-66 | 533 | 0.12 sec | 3.8 sec | 15 sec |
| Wireless 802.11 g | 54 | 1.2 sec | 38 sec | 148 sec |

The basic operations of the type 2 high speed reader 25B illustrated in FIG. 10 are described next. Assume card 1 has been inserted into reader 25B. Using firmware in the microcomputer 29, it and card 1 establish a secure session during which (a) they mutually authenticate each other and (b) card 1 transfers the secret and partial encryption and decryption parameters that it holds in its secure storage registers located in command controller 7. The microcomputer 29 combines the secret and partial encryption and decryption parameters it received from card 1 with the secret and partial encryption and decryption keys stored in a physically protected memory area of microcomputer 29 or in the cryptographic processor 27. The derived information in one embodiment is the decryption key for the information stored in the secure memory of card 1, as well as user authentication data. This information is stored in the secure areas of these logic blocks during the first initialization sequence for both the reader and the card.

After the reader and card have established a secure channel the user is authenticated by card 1 using a protocol implemented in authentication controller 8. Authentication of the user takes place by comparing a password phase previously established by the user and stored in the secure memory zone of authentication controller 8 with a password entered by the user in the host. Then, the host application issues commands to the reader via the host interface controller 31 to read or write data to the card 1. The commands are encapsulated in the Application Protocol Data Unit (APDU) which is the structure of the communication data word defined by the ISO 7816-3 standard and transmitted to reader 25B via a transport layer. The information is transmitted as commands. Microcomputer 29 determines if the data is being read from, or written to, the card and whether it needs to be decrypted or encrypted.

Upon the successful completion of the authentication sequence if a write operation request is received, the data is received from the host by the host interface controller 31. That controller 31 forwards the data to cryptographic processor 27. If the data is to be stored in the encrypted zone, based on the parameters that have been setup by microcomputer 29, cryptographic processor 27 encrypts the data that passes through it. The resulting encrypted data is then forwarded to high speed interface controller 28, for transfer to card 1. If the data is to be written to the unprotected zone or the authenticated access only zone of the memory on card 1, no encryption of data will be performed, and the data will be routed to high speed interface controller 28 without being processed by the processor 27, and then transferred to card 1.

If the storage access request is for a read operation, the data retrieved from flash storage 10 on card 1 is directed by interface controller 28 to cryptographic processor 27. If the data is retrieved from the encrypted zone, cryptographic processor 27 will decrypt the data, using the decryption parameters previously setup by microcomputer 29. The resulting decrypted data is directed to host interface controller 31 for transmission to the host. On the other hand, if the data is retrieved from the unprotected zone or the authenticated access only zone, no decryption of data is necessary, and the data is directed to host interface controller 31 for transfer to the host.

In addition to the ability to perform authentication, high speed encryption and decryption, and other sophisticated cryptographic operations, high speed reader 25B allows a card issuer, third party developer, or users, to develop custom applications and load them into the code store of microcomputer 29 for subsequent execution to carry out the intended tasks.

The operational features of the type 1 high speed reader 25A are similar to those of the type 2 reader 25B. In the type 1 reader 25A, however, the host computer performs the setup configuration of the logic blocks 26, 27 and 28 as described above. A type 1 reader is particularly useful in environments where card 1 operates with a secure host.

The systems described above provide numerous advantages over known storage devices such as conventional 32-bit Smart Cards capable of performing encryption and decryption and USB storage devices with flash-based storage and high speed encryption and decryption logic. In particular, in these prior art devices, the encryption engine that resides on the Smart Card or the USB storage device adds significantly to the cost of the removable-transportable medium. In contrast, the card provided herein need not include the cryptographic engine because it is provided in reader 25A or 25B. Thus, card 1 is less expensive to manufacture. Presently this price difference is significant for storage devices of medium capacity, for example, devices having on the order of 64 megabytes or less. In applications, such as health cards where the number of cards to be deployed is large, the system of this invention provides a significant cost benefit because a large number of cards can be purchased less expensively, and a significantly smaller number of high speed readers 25A or 25B need to be acquired.

The security of the typical Smart Card or USB "dongle" is contained on the device. Thus, if a user loses the card or the dongle, an adversary need only attack this device to reach potentially sensitive data stored therein. In contrast, for the card and reader system described herein, security is distributed between the high speed reader 25A (or 25B) and card 1. To successfully reach the data stored on card 1, an adversary must breach the security of both card 1 and high speed reader 25A (or 25B).

Figure 11:
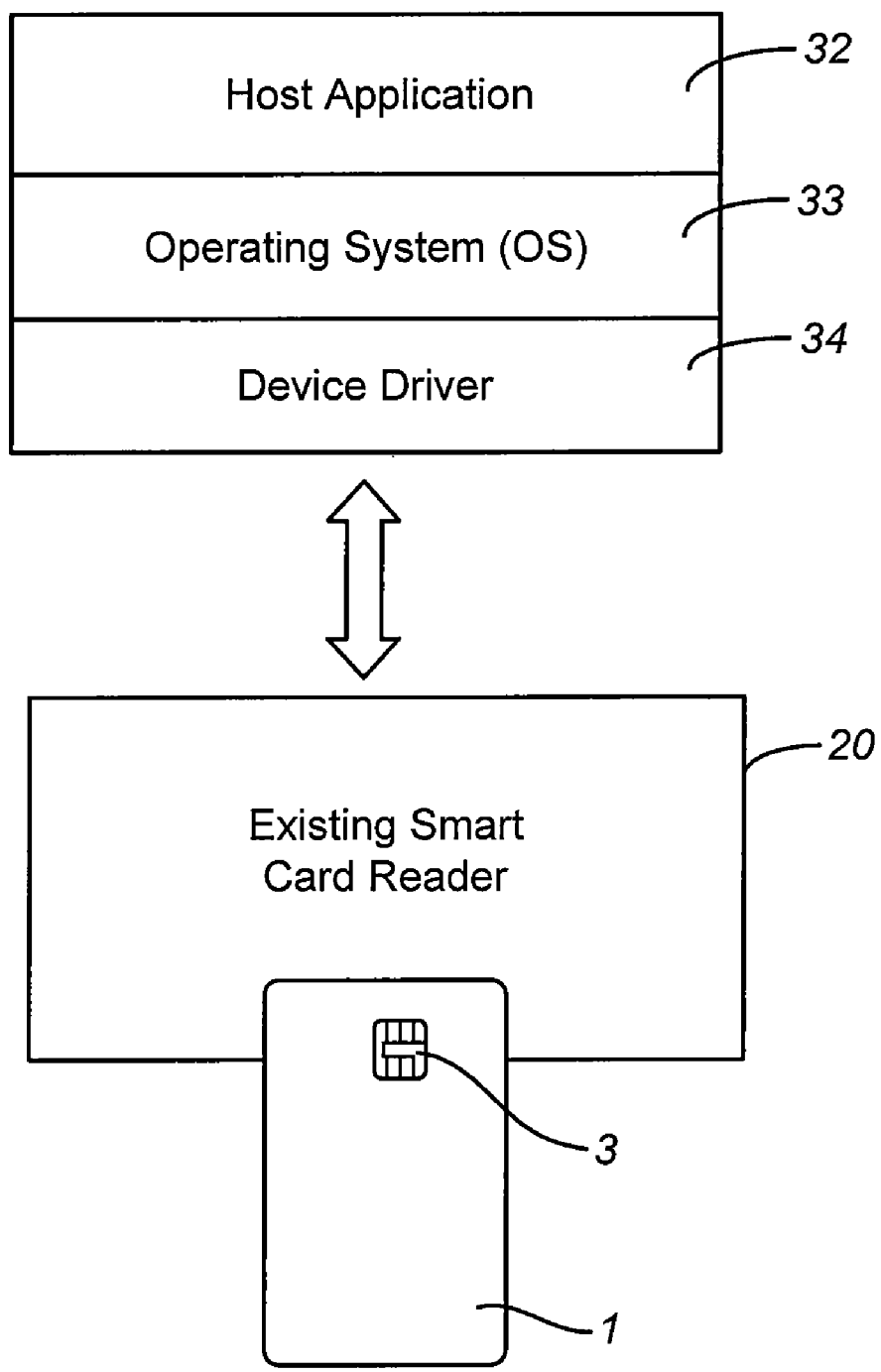
FIG. 11 is a diagram illustrating software and hardware modules of the card installed in a reader.

As described below, support for legacy applications can be achieved with card 1. The operation of card 1 in conjunction with an industry standard Smart Card reader 20 and a host application 32 is illustrated in FIG. 11. Device driver 34 is a software module that resides under the operating system layer 33 of the host software, and interfaces with card 1 via reader 20. It establishes a handshake with interface switch 6 of card 1. This operation includes performing the authentication protocol contained in logic blocks 7 and 8. Then it translates operations that access typical Smart Card operations in APDUs (Application Protocol Data Units) based on the 7816-3 protocol. These translate operations access the high capacity flash module 10 of card 1 using vendor unique Smart Card APDUs based on the 7816-3 protocol.

When interface switch 6 of card 1 establishes a handshake with device driver 34, the controller checks the communication protocol. If it finds an ISO 7816-3 serial protocol, then the card "knows" that the reader is a standard Smart Card reader 20. If it finds a different protocol then it can react accordingly. Once interface switch 6 determines the reader type, it then processes the 7816-3 APDUs in the manner below.

If the APDU is a Smart Card command intended for a typical Smart Card function, interface switch 6 routes the command to command controller 7 and authentication controller 8. It then forwards the result, and or the status of the command execution, back to the reader via the 7816-3 protocol. If the APDU contains a storage request to access flash memory 10 of card 1, interface switch 6 translates the APDU into a storage command and forwards it to the flash memory controller 9. After the flash memory controller 9 returns the result and/or status of the command execution, interface switch 6 formats the returned information into a valid APDU format and sends this information to the reader via the 7816-3 protocol.

A software driver is a type of computer software that allows interaction with hardware devices. Typically the driver provides an interface for communicating with a device through a specific computer bus or communications subsystem to which the hardware is connected. The driver provides commands to and receives data from the device, and on the other end, provides an interface to the host operating system and software applications. Device driver 34 essentially hides the details of card 1 from the application 32, making it appear to be a standard high capacity Smart Card. It accomplishes this by creating appropriate APDU formatted commands that only the interface switch 6 can interpret to perform the appropriate task as described above. In the mode when the interface switch 6 returns the response, this device driver interprets this data and communicates it to the application as a Smart Card response or data from storage 10 contained on card 1. Device driver 34 can be distributed to users via web sites over the internet, or through a distribution media such as an optical disk. For host systems that use operating systems such as Windows 2000 or Windows XP with this functionality already included, a device driver is not necessary to communicate with the high speed Smart Card reader 25B.

Device driver 34 also can provide users access to sensitive data stored in the encrypted zone. This can be done by embedding the secret encryption and decryption parameters, such as the partial keys that would reside in high speed reader 25A or 25B, within the driver. Skilled practitioners of computer security, however, will recognize that such an approach provides malicious users with a means to subvert the security of the data stored in the encrypted zone. This is because it is easier to "spoof" device driver 34 than reader 25A or 25B. Therefore, when an existing Smart Card reader is used, it is prudent to allow the user access to only the unprotected zone of the flash memory to maintain a high level of security for the sensitive data.

What is claimed is:

1. In a system having a reader for securely reading data from a portable card, the card comprising:
    a connector to enable the card to be coupled to the reader to enable the reader to at least retrieve information stored on the card;
    a first controller connected to the connector for enabling the reader to read data at a first slower speed from a first memory on the first controller;
    a second controller connected to the connector for enabling the reader to read data at a second faster speed;
    an interface switch coupled to each of the first and second controllers for detecting whether the connector is connected to a reader operable at the slower speed or the faster speed;
    a memory controller coupled to the interface switch and to a second memory to enable the reader to read information from the second memory;
    an authentication controller coupled to the interface switch for determining whether the card and the reader are permitted to exchange information;
    a command controller coupled to the interface switch for detecting commands received by the interface switch from the reader and retrieving information in accordance with received commands.

2. A card as in claim 1 wherein the connector further allows the card to be coupled to a reader to further allow the reader to store information on the card.

3. A card as in claim 1 wherein when inserted into a reader compliant with only ISO 7816 the reader can access only the first memory on the first controller.

4. A card as in claim 1 wherein the card communicates with the reader using a set of external electrical contacts on a surface of the card, and wherein the communication between the card and the reader is selectable between the slower speed and the faster speed based on a clock signal from the reader.

5. A card as in claim 1 wherein in the first slower speed format each of the contacts on the card has a first function and is operable only in accordance with that first function.

6. A card as in claim 5 wherein in the second faster speed format at least some of the contacts on the card are operable in a multiplexed mode to perform a second function in addition to the first function to thereby increase data transmission speed between the card and the reader.

7. A card as in claim 1 wherein the electrical contacts on the card are configured to comply with ISO 7816.

8. A card as in claim 7 wherein when the card operates in accordance with ISO 7816 the only memory that can be accessed by the reader is the memory on the first controller.

9. In a system for protecting sensitive information stored on a card wherein the card is to be coupled to a reader having a controller for communicating with the card and including a cryptographic processor for encrypting and decrypting the sensitive information, the card comprising:
    a connector to enable the card to be coupled to the reader to enable the reader to at least retrieve information stored on the card;
    a first controller connected to the connector for enabling the reader to read data at a first slower speed from a first memory on the first controller;

a second controller connected to the connector for enabling the reader to read data at a second faster speed;

an interface switch coupled to each of the first and second controllers for detecting whether the connector is connected to a reader operable at the slower speed or the faster speed;

a memory controller coupled to the interface switch and to a second memory to enable the reader to read information from the second memory;

an authentication controller coupled to the interface switch for determining whether the card and the reader are permitted to exchange information;

a command controller coupled to the interface switch for detecting commands received by the interface switch from the reader and retrieving information in accordance with received commands; and wherein to protect information in the second memory the authentication controller and the cryptographic processor communicate with each other and do not allow information to be read from or written to the second memory unless the authentication controller recognizes the cryptographic processor and the cryptographic processor recognizes the authentication controller.

10. A card as in claim 9 wherein the connector further allows the card to be coupled to a reader to further allow the reader to store information on the card.

11. A card as in claim 9 wherein when inserted into a reader compliant with only ISO 7816 the reader can access only the first memory on the first controller.

12. A card as in claim 9 wherein the card communicates with the reader using a set of external electrical contacts on a surface of the card, and wherein the communication between the card and the reader is selectable between the slower speed and the faster speed based on the clock signal from the reader.

13. A card as in claim 12 wherein in the second faster speed format at least some of the contacts on the card are operable in a multiplexed mode to perform a second function in addition to the first function to thereby increase data transmission speed between the card and the reader.

14. A card as in claim 9 wherein in the first slower speed format each of the contacts on the card has a first function and is operable only in accordance with that first function.

15. A card as in claim 9 wherein the electrical contacts on the card are configured to comply with ISO 7816.

16. A card as in claim 15 wherein when the card operates in accordance with ISO 7816 the only memory that can be accessed by the reader is the memory on the first controller.

* * * * *